UNITED STATES PATENT OFFICE.

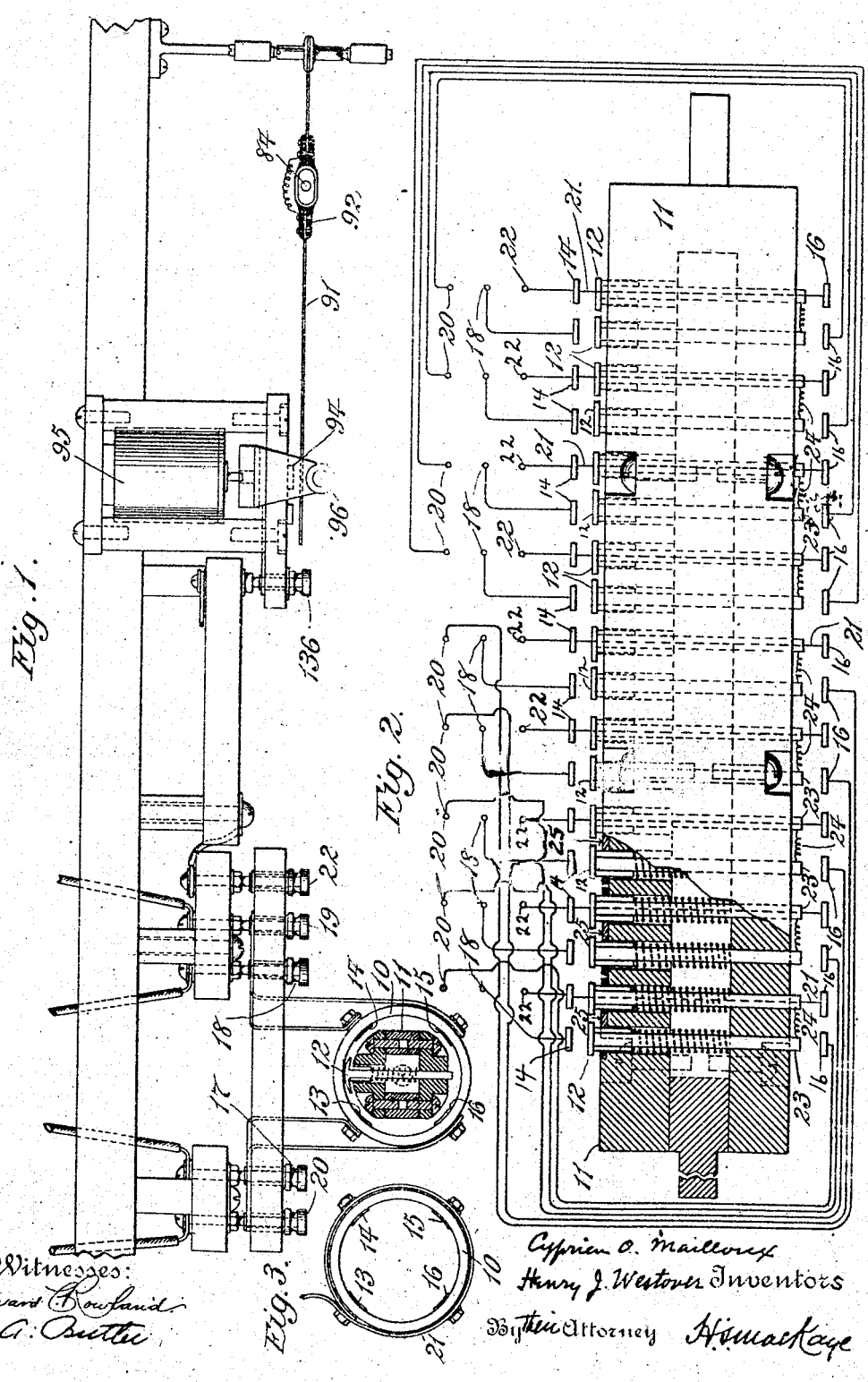

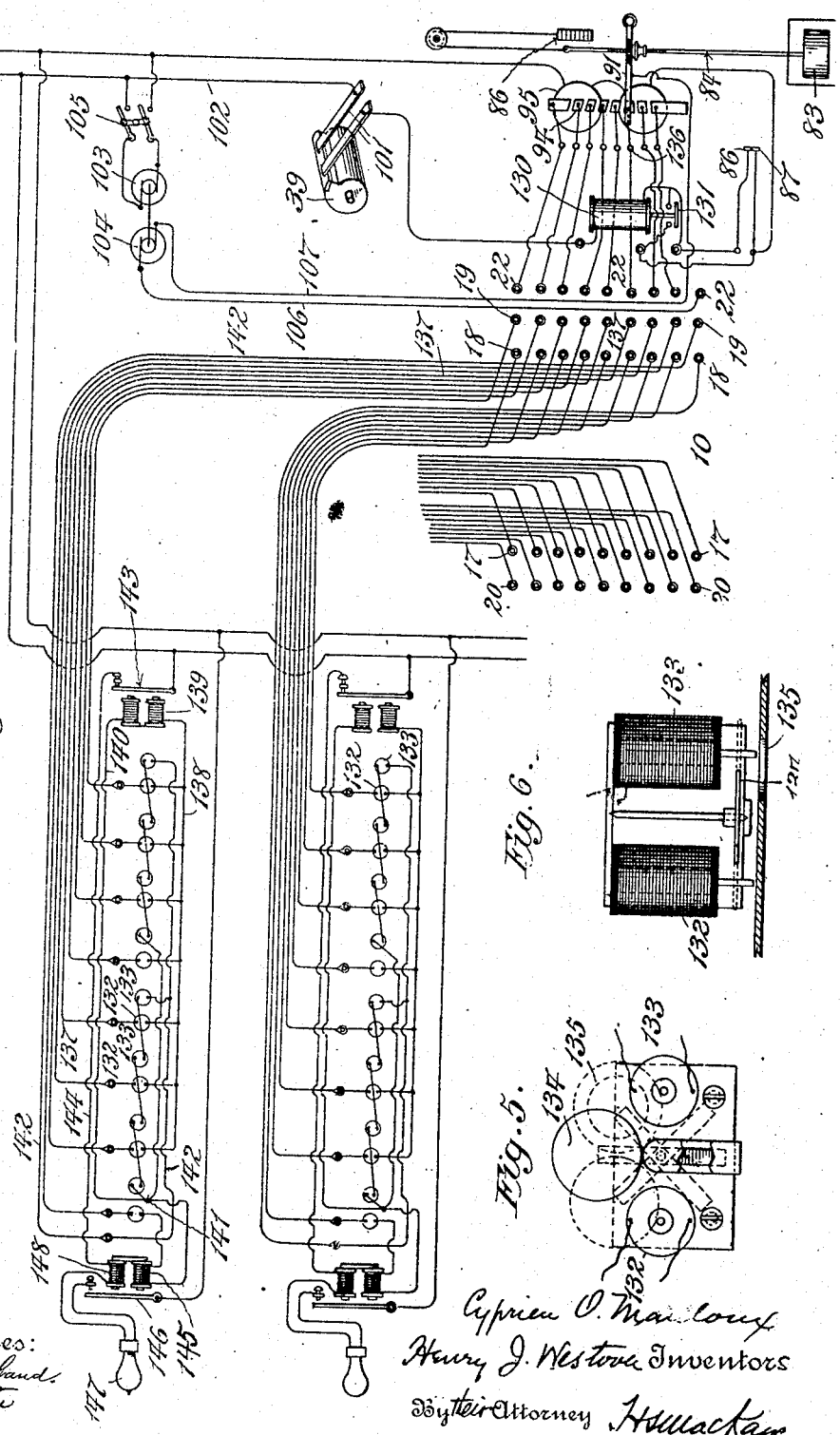

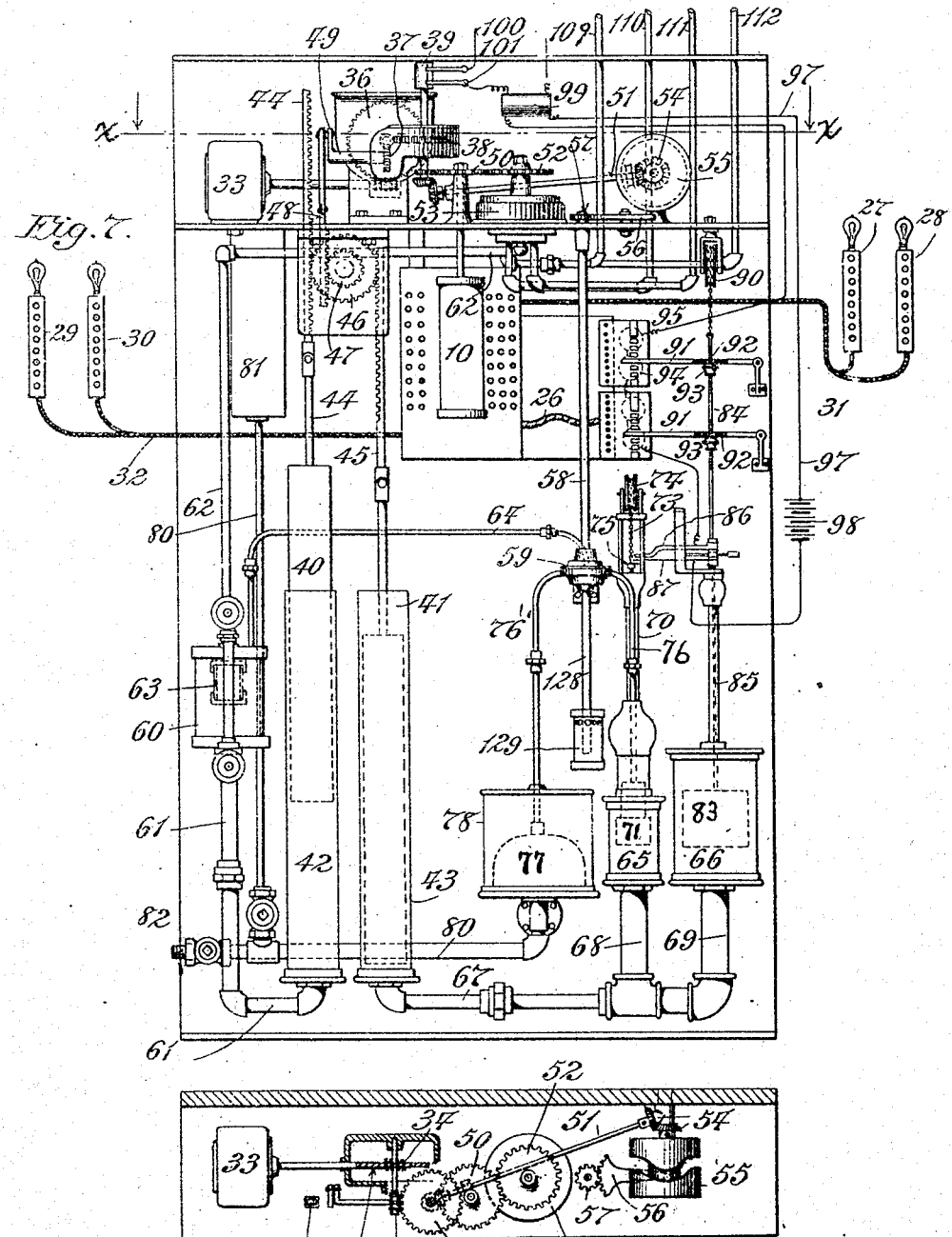

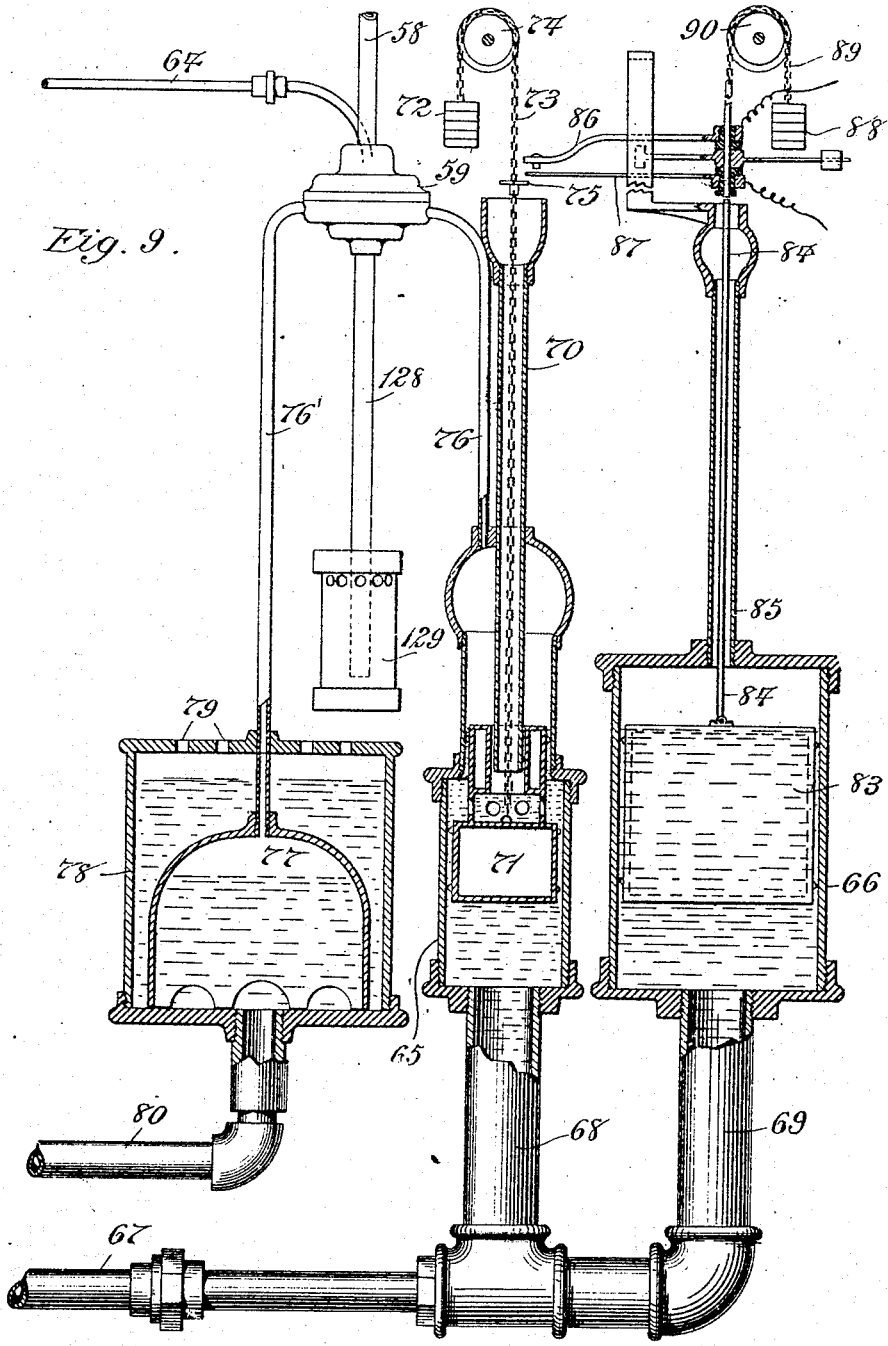

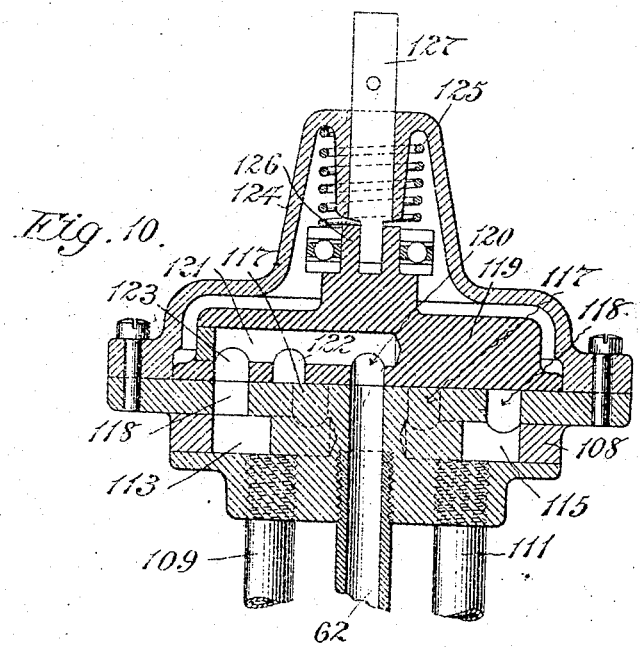
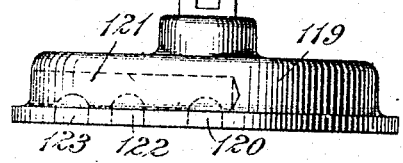
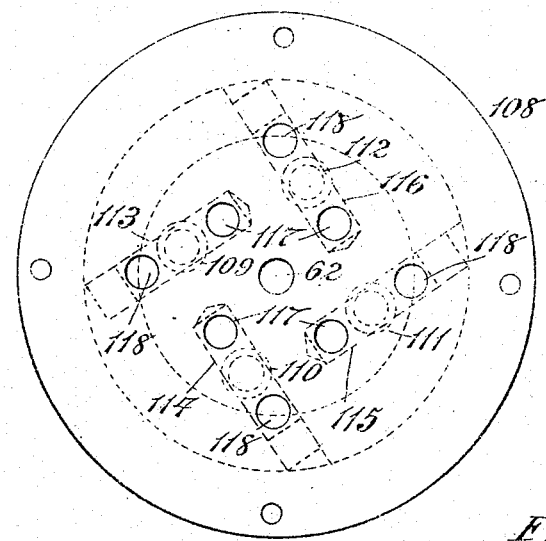

CYPRIEN O. MAILLOUX AND HENRY J. WESTOVER, OF NEW YORK, N. Y.

INDICATING GAS-ANALYZER.

1,014,241. Specification of Letters Patent. Patented Jan. 9, 1912.

Application filed January 21, 1910. Serial No. 539,419.

*To all whom it may concern:*

Be it known that we, CYPRIEN O. MAILLOUX and HENRY J. WESTOVER, citizens of the United States, residing in the city, county, and State of New York, have invented a certain new and useful Improvement in Indicating Gas-Analyzers, of which the following is a specification.

Our present invention has relation to an improved apparatus for automatic successive determination of the percentages of $CO_2$ or other gas in any gas mixture or mixtures and the production of substantially simultaneous indications of such proportions in a manner to provide the maximum of certainty and convenience.

Our apparatus lends itself readily to a number of various applications, among which may be prominently mentioned the analysis and indication of $CO_2$ percentages in the flue gases of boilers or the exhaust of gas engines. It may also be used for a like determination of percentages in producer gas, wherein, however, the probable range of percentages will be quite different from that to be expected in the cases first named. Our apparatus lends itself to easy special design for any expected range of indications.

Our present invention is illustrated in certain preferred forms in the accompanying drawings, wherein—

Figure 1 is an upper plan view on a large scale of the indicating circuit closer and showing the selective switch in partial section, Fig. 2 is a diagram on a large scale of the electric circuits associated with the selective switch and showing said switch partly in elevation and partly in section, Fig. 3 is an end view of the selective switch showing the preferred arrangement of certain conductors, Fig. 4 is a diagram of the general circuits as preferably arranged, Fig. 5 and Fig. 6 are detail views of individual polarized signals in the annunciator, Fig. 7 is a general elevation of the entire analyzer, Fig. 8 is a plan view of the upper portion of the same under the line $x$—$x$ of Fig. 7, and Figs. 9 to 13 are enlarged detail views of certain portions of the analyzer.

We have herein shown and described our invention as adapted to giving successive indications of the percentages of $CO_2$ (or other gas) from four separate sources (such as furnaces, producers, etc.) all delivering mixed gases, one at a time, to the same central analyzer. It will, however be understood that it is within the scope of our present invention to adapt the same to use with a single source of gas or with more than four sources.

In the form shown the central analyzer shown in Fig. 7 is associated with four separate annunciators with which it is successively and automatically placed in operative connection by means of a selective switch 10 and its associated circuits. This selective switch may take a great variety of forms which will suggest themselves to those skilled in this art. One of the preferred forms is shown in Figs. 1 to 4, wherein a central insulating revoluble core 11, carries a row of buttons 12 adapted to press upon corresponding fixed contacts arranged in four equidistant rows, 13, 14, 15 and 16, supported by the outer framework of the switch 10. The fixed contacts are so disposed as to form, not only vertical rows 13 to 16, but horizontal rings of four as shown in Figs. 1 and 3. The contacts 13 to 16 in each alternate ring of four are electrically connected to the binding posts or terminals 17, 18, 19 and 20, respectively; while the four members of the other alternate rings are all connected together by a conductor 21 as shown in Fig. 3, which in turn leads to a binding post in the row marked 22.

Fig. 2 is a diagram wherein two diametrically opposite rows of contacts 14 and 16 are shown, and from which the arrangement of circuits in relation to the rows 13 and 15 will be readily understood. In the particular arrangement shown there are four rows of fixed contacts, corresponding to four separate sources of gas to be analyzed, and in each row are nine pairs of fixed contacts corresponding to eight indications of percentage in the annunciators hereinafter described. These numbers may of course be varied according to the particular conditions to be met in any case.

The buttons 12 on the rotary inner core 11 are connected electrically in pairs. This we preferably accomplish as shown by providing each button with a guiding stem 23, connected each to its neighbor on one side by a wire 24. Each pair of stems 23 passes through a separate conducting plate 25 which serves further to establish the necessary electric connection. As shown in Fig. 2, these pairs of electrically united buttons are so placed with respect to the fixed buttons, with which they may be brought successively into contact by rotation of the switch, as to serve by such contact to form an electric bridge from one of the independent buttons (connected to terminals 17 to 20) on the one hand, and the electrically united buttons (shown in Fig. 3 and connected to terminals 22) on the other hand. For this reason these may be termed "bridging contacts".

In Fig. 7, the apparatus so far explained is indicated simply at 10, the electric connections with other parts being indicated by the cable 26. The four annunciators with which it is operatively connected are shown at 27 to 30, and the cables 31, 32, indicate the connections.

The general arrangement of the analyzer for successive use with four sources of mixed gas will first be described, the various parts being explained afterward in detail.

The electric motor 33, provides power for motion of all the parts, its high speed being reduced by means of two successive worms 34, 35 connected by the worm wheel 36. The worm 35 operates both through worm wheel 37 to run the displacing plungers, and through worm wheel 38 to operate the main timing switch 39 mounted on the shaft of said wheel. The displacing cylinders 40, 41, are moved loosely up and down within the cylinders 42, 43, by means of racks 44, 45, engaging the gear 46, turning with the gear 47, which is operated by the rack 48, attached to the crank 49 on the shaft of the wheel 37. The shaft of the wheel 38 drives the gear 50, and the inclined shaft 51. The gear 50 rotates the switch 10 heretofore described and also drives the gear 52, which operates the four way valve 53, hereafter described. By means of bevel gears 54, the shaft 51 turns the rotary cylinder-cam 55 whereby a rotary reciprocation is imparted to the toothed sector 56, which acts through the gear 57 to turn the stem 58 of the three-way valve 59.

The displacing plunger or piston 40, moving up and down within the reservoir 42 causes an appropriate rise and fall of liquid in the gas pumping chamber 60, which is connected with 42 by the pipe 61. By this means gas is alternately drawn in from the induction pipe 62 (through the permanent liquid seal 63), and forced out through the eduction pipe 64. At the same time, and acting in opposition with 40, the displacing plunger 41 alternately raises and lowers the level of liquid in the measuring chamber 65 and the supplemental float chamber 66 which are connected together and to the cylinder 43 by the main pipe 67 and the branches 68, 69. The chamber 65 communicates with the atmosphere by means of the straight open tube 70, and contains a float 71, properly balanced as by a weight 72, connected to said float by the chain 73 passing over the pulley 74 and down through said tube 70. Upon this chain is mounted the circuit controlling tappet 75. (See Fig. 9.) The lower end of the tube 70 extends far enough down into the chamber 65 to leave a suitable measuring space within said chamber above the lower end of the tube, wherein a predetermined quantity of gas at atmospheric pressure is confined by the rising of liquid within said chamber 65. A pipe 76 of fine bore connects the top of the measuring chamber 65 with the inverted bell 77 within the absorption chamber 78. This latter chamber communicates with the atmosphere by openings 79 in the top, and, for convenience it is supplied with a proper absorbing liquid (for instance a solution of caustic potash) by means of the pipe 80 leading from an appropriate reservoir 81 and commanded by a valve 82.

Within the chamber 66 there moves a float 83, to the top of which is fixed a stem 84, passing out through the tube 85, and carrying the principal automatic circuit closer. This last comprises two laterally projecting arms 86 and 87, insulated from each other and the rod 84. The arm 87 is a flexible spring, and the two are so placed as to make contact when the two arms descend far enough to strike the tappet 75, over which both arms extend as shown. The float 83 and the parts attached thereto are balanced by a weight 88, to which they are connected by a chain 89, passing over a pulley 90. The rod 84 is arranged to command the position of one or more switch arms 91, of corresponding indicating switches best shown in Figs. 1 and 4. Each arm 91 is preferably made in two parts of conducting material, connected as shown by insulation 92, provided with an opening through which the rod 84 passes. Under each arm 91, and adjustably threaded on the rod 84 is a lifting nut 93 upon which rests the insulating portion of the switch arm.

In Fig. 7, we have shown two indicating switches to show that our apparatus is capable of commanding simultaneously any reasonable number of indicating systems. Each switch arm is laterally flexible, and its outer extremity is moved by the rod 84 along, but normally out of contact with, the separated switch contacts 94, behind which is located the electro-magnet 95. We prefer to place a confining bar 96 outside the normal plane of movement of the switch arm 91. The magnet, or magnets, 95 are in a local circuit 97, supplied by a generator 98. As shown in Fig. 7, this circuit includes the principal circuit closing arms 86, 87 and is closed when these arms touch each other.

There is also in the circuit 97 one side of a relay 99, whereby we preferably use a strong exterior circuit 100, including the other side of said relay and the brushes 101 bearing upon the rotary switch 39 heretofore described. By this means we are enabled to use a local circuit of say fifteen volts in connection with the ordinary 110 volt light circuit.

In Fig. 4 is shown a different form of relay circuit, wherein the external circuit 102 drives a small motor-generator 103, 104, supplied through an appropriate switch 105. The armature of the generator 104 is connected to local mains 106, 107, whereby current is supplied for purposes of indication. The motor 33, which actuates the various portions of the analyzer as above described, may be also employed as the motor portion of this motor-generator. Our invention is not, however, limited to this particular arrangement, but covers the use in this connection of any motor-generator. It is to be further understood that our invention is not limited to the use of an exterior circuit and a local circuit. Obviously a single source of current may be relied upon for operation of all parts of our apparatus.

Before proceeding to explain the particular manner shown in the drawings for causing the position of the switch arm 91 to affect the indicator or annunciator, we shall explain the operation of the mechanism so far described, so as to make clear the means whereby the position of said arm 91 at the moment of circuit closure is made dependent upon the proportion or percentage of $CO_2$, or other gas to be determined in the mixture analyzed.

In Figs. 10 to 13 is shown the preferred form of four-way valve used at 53, by use of which samples of gas are successively conveyed to the automatic analyzer from four different sources of mixed gas. The particular form of valve shown (which is not essential to this invention) comprises a fixed base 108, shown in section in Fig. 10 and in plan view in Fig. 11. The pipe 62 whereby samples of gas are led from this valve to the pumping chamber 60 enters under the base 108 and ends in an opening at the top of said base. Samples of mixed gases from the four individual sources are led to the base by four pipes 109, 110, 111, 112, which lead under the valve to obliquely cut chambers 113, 114, 115, 116, cut in the body of said base. Each of said chambers communicates with the top of said base through two openings 117, 118 at different distances from the center. These are so placed that the four openings 117 lie in a circle concentric with the pipe 62, while the opening 118 lies in another circle around the same center. Upon the upper plane surface of the base 108 there rests a movable member 119, closely fitting said plane surface and adapted to revolve upon it. The movable member is provided with a central opening 120, which registers with the central opening in the base, and communicates by a radial chamber 121 with two vertical passages, 122, 123, so placed as to register successively with the respective openings 117, 118, as the movable member revolves. The movable member 119 is confined to its seat by a shell 124, bolted or otherwise, fastened to the base. A spring 125 bears down upon the movable member, the top of which is provided with a pair of lugs 126 between which fits the end of the shaft 127 of the gear wheel 52, whereby the movable member is revolved. It will be seen that, as this movable member is continuously revolved by the motor 33, as heretofore described, the chamber 121 will transmit to the pipe 62 two successive fractional portions of the same gas mixture, from the openings 117, 118, respectively of each chamber in the fixed base. By use of this arrangement we are enabled to obtain the requisite quantity of gas without using unduly large valve openings, thus efficiently separating the various conveyers of different gases.

We shall now explain the operation of the entire automatic analyzer, whereby the arm (or arms) 91 is made to assume a position corresponding to the proportions of $CO_2$ (or other gas to be determined) in the mixture.

Assuming the parts to be in the position shown in Fig. 7, and the motor 33 to be running, the chamber 60 will be free of liquid, due to the fact that the plunger 40 has just risen and the level of the liquid in 60 has fallen. Gas has thus been caused to rush into the chamber 60 through 62 from the proper pipe (109, 110, 111, or 112) say through one of the openings 117 in the valve 53, which has just closed. In this position, the plunger 41 being depressed, the displaced liquid has filled the vessels 65, 66, driving out all previous gas from 65, at first through the pipe 70 to atmosphere and then, after the liquid rises above the lower end of 70, driving the measured quantity still in the chamber 65, through the pipe 76, three-way valve 59 and pipe 76′, into the bell 77, where the absorbing liquid is displaced, rising around the inner bell in the outer vessel 78. Of course the floats will rise in both chambers 66 and 65, carrying with them the circuit closer 86, 87, on the one hand and the abutment 75 on the other hand. At this time the main selecting switch 10 will complete communication (as hereinafter described) between the arm 91 and the particular annunciator or other automatic indicator corresponding to the particular source of mixed gases from which gas has just been forced into the chamber 77, 78. As the motor 33 continues to move, the rack 48, moving downward, will cause depression of the plunger 40, with simultaneous elevation of the plunger 41, whereby (valve 53 being closed) rise of liquid in chamber 60 and withdrawal of liquid from 65 and 66 will cause two movements of gas to take place. One of these is a transfer of all the gas from chamber 60, through the pipe 64 and three-way valve 59 to the atmosphere, by pipe 128 and water seal 129. This is called the "scavenger gas", and its function is to clear the pipe 64 of any portion of the previously tested sample of gas which may remain therein, substituting gas of the same quality and proportion as that next to be tested. The second movement of gas is the return from the absorbing chamber, 78, through the tube 76' and valve 59 to the measuring chamber 65. It is the action of this residual gas which determines the indication of percentage. It is clear that, the greater the percentage of $CO_2$, (or other gas absorbed in 78) the greater will be the diminution of volume of the originally measured gas due to absorption. Now as the two floats 71 and 83 move downward simultaneously, the former will at first move the faster, owing to pressure of absorbing liquid in 78, acting through the residual gas. Hence the tappet 75 will keep safely in advance of the circuit closing arms 86, 87. As downward motion continues, however, the residual gas will be more and more rarefied, until finally it will reach a point where the pressure of the atmosphere exerted through the pipe 70 will prevent further downward movement of liquid in 65, and the float 71, with the tappet 75, will stand still. This point will depend upon the degree of diminution of volume due to absorption, and its position will therefore indicate the percentage of the gas to be determined. Downward movement of the float 83, with the circuit closer 86, 87 and the switch arm 91 will continue, and in consequence the arm 87 will finally touch the tappet 75, which will cause closure of circuit at 86, and will energize the magnet 95. This will cause the arm 91 to move laterally against the particular switch contact 94 to which it is opposite at the moment circuit is closed at 86, 87, thereby producing an indication of the desired percentage, preferably in the manner hereinafter described. At this time the circuit at switch 39 is closed. When next the plungers 40, 41, reverse their movement, the rising of 40 will draw into 60 a second sample of the same mixture of gas as was used as a scavenger. This will come through the particular opening 118 in the valve 53 which corresponds to the opening 117 through which the scavenger gas was drawn. At the same time, the lowering of 41 forces liquid upward in chambers 65, 66, raising both floats and forcing out all gas from 65, through the three-way valve to atmosphere at 129. The plungers 40, 41, will then again reverse their movements, when, by descent of 40, the new sample will be forced over through the valve 59 to chamber 65. At the same time liquid will recede again in chambers 65 and 66. During this descent the circuit closer 86, 87, may touch the tappet 75, but this will be without result, because the switch 39 will be open. Further movement simply repeats the operation above described for the sample of gas from the next successive source.

The means whereby the position of the switch arm 91 or its equivalent may be made to produce an appropriate indication of the percentage of gas tested may be greatly varied without departing from our invention. Our preferred apparatus for this purpose is illustrated diagrammatically in Fig. 4, taken in connection with Figs. 1, 2 and 7. The arrangement of Fig. 4, as already stated, is intended for use with a main high tension and a low tension local circuit.

When circuit is closed at 86, 87, it is broken there again almost instantly. Consequently we insert a circuit preserving device in this circuit, preferably comprising the solenoid 130, whose core operates a conducting bar 131 which acts to close a branch circuit around the principal circuit closer 86, 87, through the solenoid itself. By this means the indicating circuit is rendered sufficiently reliable to insure operation of the annunciator. When the switch 39 breaks the principal circuit, the core of the solenoid 130 is released.

Any appropriate form of annunciator may be used without departing from our invention. One preferable form is shown in Figs. 4, 5, and 6. The mutual relation of two of these is shown in Fig. 4, together with their connections with the selecting switch shown in Figs. 1 to 3. The remaining two annunciators should be connected in the same way. Each annunciator comprises a row of polarized electro-magnets, whose poles 132 and 133 are arranged to be separately energized. The pole 133 acts to throw the shutter 134 to the left hand position in Fig. 5, where it is invisible. The pole 132, throws the shutter to the right hand position where it may be seen through the opening 135, thus affording an indication. The shutter 134 will preserve the position given it by either pole 132 or 133 until the other pole next acts.

Assuming the arm 91, to be in the position shown in Fig. 4 when circuit is closed through the magnet 95, it will make contact with the corresponding terminal 94 and circuit will be closed through that annunciator which is for the time being connected through the selecting switch 10. Assuming this to be the upper annunciator in Fig. 4, this circuit will run as follows: from generator 104, by wire 107 to arm 91, to binding post 136, similar post 22, contact member 4 from the bottom in the row 19, by wire 137 to magnet pole 132 which is third from the left in the top annunciator, to wire 138, by magnet 139, wire 140, terminal 141, thence through all the restoring coils on poles 133 in two parallel branches to wire 142, to the lowermost terminal 19, through switch 10 to the lowermost terminal 22, and back by wire 106 to the generator. This will cause a suitable indication by throwing of a shutter, while, at the same time any previous indication will be effaced by the action of the weaker divided current through the restoring coils. At the same time, the energized magnet 139, acting upon the switch armature 143, will open the alarm circuit 144, referred to hereinafter. It will be seen that this last effect will accompany the action of each of the magnet poles 132, except the last to the left in the figure. This extreme pole corresponds to an extreme condition of analysis, and in many cases it will be found desirable to provide an alarm of some kind to call attention to the extreme condition in question. For this purpose the preferred device shown comprises a magnet 145 which attracts an armature 146, whereby an alarm circuit is closed from the main circuit 102, through a lamp 147. A magnet 148 in this circuit keeps it closed until the next indication other than the extreme one occurs, when, as above mentioned, the magnet 139 is energized, and circuit is opened at 143.

It will be seen that by use of this apparatus, the central automatic analyzer produces, in each annunciator successively, an indication of the percentage of gas in the particular sample mixture just tested. Since the selecting switch 10 and the four-way valve 53 move constantly in correspondence, it is possible to give correct indications at desired intervals of the percentage of a certain gas existing in a number of mixtures successively. Each source of gas mixture has a separate annunciator appropriated to it, and all of the annunciators may be placed wherever found most convenient. It is obvious that our invention is capable of use with any desired reasonable number of sources of gas mixture, and that we are not confined to four as shown.

Many different modifications of structure and arrangement may be introduced into this device without departing from our invention, and we are not limited to the details herein shown and described.

What we claim is—

1. A device of the class described comprising in combination an automatic gas analyzer, a plurality of gas conveyers, a number of separate temporary indicators each complete in itself, and means for automatically and successively bringing each conveyer and its corresponding indicator into operative relation with said analyzer, substantially as described.

2. A device of the class described comprising in combination an automatic gas analyzer, a plurality of gas conveyers, a number of separate temporary indicators each comprising means for preserving its indication for a limited interval of time, and means for automatically and successively bringing each conveyer and its corresponding indicator into operative relation with said analyzer, substantially as described.

3. A device of the class described comprising in combination an automatic gas analyzer, a plurality of gas conveyers, a valve for connecting said conveyers successively to said analyzer, a plurality of electro-magnetic annunciators each comprising indicating and restoring circuits, a selecting switch for connecting both said indicating and restoring circuits in each annunciator successively to said analyzer, and means for causing said valve and selecting switch to operate always in appropriate correspondence, substantially as described.

4. A device of the class described comprising in combination an automatic gas analyzer, a plurality of gas conveyers, a valve for connecting said conveyers successively to said analyzer, a plurality of electro-magnetic annunciators, a selecting switch, an external main circuit, a local circuit depending thereon and including said analyzer and said switch, circuits between said switch and said annunciators, and means for causing said valve and selecting switch to operate always in appropriate correspondence, substantially as described.

5. A device of the class described comprising in combination an automatic gas analyzer, a plurality of gas conveyers, a valve for connecting said conveyers successively to said analyzer, a plurality of electric annunciators, a main circuit arranged to be controlled by said analyzer, a local circuit deriving its energy from said main circuit, means actuated by said main circuit for closing said local circuit, a selecting switch for controlling the relation of said local circuit with said annunciators, and means for causing said valve and selecting switch to operate always in appropriate correspondence, substantially as described.

6. A device of the class described comprising in combination an automatic gas analyzer, a plurality of gas conveyers, a valve for connecting said conveyers successively to said analyzer, a plurality of electric indicators, a main circuit arranged to be controlled by said analyzer, a motor generator driven by current from said circuit, and circuits fed by current from said motor-generator for controlling said indicators, substantially as described.

7. A device of the class described comprising in combination an automatic gas analyzer, an electric motor for actuating the same, a generator driven thereby, a plurality of gas conveyers, a valve for connecting said conveyers successively to said analyzer, a plurality of electric indicators, a main circuit for feeding said motor and having a branch controlled by said analyzer, and circuits fed by current from said generator for controlling said indicators, substantially as described.

8. A device of the class described comprising in combination an automatic gas analyzer, a multiple contact switch controlled thereby, a number of electric indicators, each separate from the others and complete in itself, a number of gas conveyers, a selecting switch, a valve for said conveyers, means for causing said selecting switch and valve to move in correspondence, and means controlled by said analyzer for periodically directing current through said switches to said indicators successively, substantially as described.

9. A device of the class described comprising in combination an automatic gas analyzer, a swinging switch lever moved thereby, a row of switch contacts over which said lever is adapted to swing, a multiple electric indicator, circuits between said indicator and said switch contacts, electromagnetic means tending, when energized, to draw said lever against one of said contacts, and a circuit for said electro-magnetic means controlled by said analyzer, substantially as described.

10. A device of the class described comprising in combination an automatic gas analyzer, a multiple contact switch controlled thereby, an electric indicator, an alarm associated with said indicator, an alarm circuit, means for controlling said alarm circuit, and operating circuits controlled by said switch for operating said last named means and said indicator, substantially as described.

11. A device of the class described comprising an automatic gas analyzer, a multiple contact switch operated thereby, and a plurality of indicators; in combination with a selecting switch adapted to move in unison with said analyzer and comprising a separate row of fixed contact buttons for each of said indicators wherein the alternate buttons are electrically connected respectively to said indicators and to said multiple contact switch, and a row of movable contact buttons electrically interconnected in pairs and arranged to make contact with said separate rows of fixed buttons successively, substantially as described.

12. A device of the class described comprising an automatic gas analyzer, a number of gas conveying pipes from various sources, and a single conveying pipe leading to said analyzer; in combination with a rotary valve at the junction of said pipes comprising a fixed portion containing a separate passage communicating with each of said first named conveying pipes and having two openings located in different radii and at different distances from the center of said valve, and a movable portion having a passage permanently in communication with said pipe leading to the analyzer and having two openings adapted to register successively with the two openings of the various passages in the fixed portion of the valve, substantially as described.

13. A device of the class described comprising an automatic gas analyzer, a number of gas conveying pipes from various sources, and a single conveying pipe leading to said analyzer; in combination with a valve at the junction of said pipes adapted to establish a plurality of distinct connections between said single pipe and each of said first named conveying pipes in succession, substantially as described.

14. A device of the class described comprising indicating means in combination with an automatic gas analyzer comprising a float carrying a circuit closer, a second float carrying a tappet adapted to operate said circuit closer when contact is made therewith, a liquid for moving said floats up and down, means for admitting atmospheric pressure to the liquid supporting said first named float, and means for subjecting the liquid supporting said second float to the pressure of the residue left after absorption of one of its ingredients from a measured quantity of mixed gas, substantially as described.

CYPRIEN O. MAILLOUX.
HENRY J. WESTOVER.

Witnesses so far as regards Cyprien O. Mailloux:
  H. D. JAMESON,
  F. L. RAND.

Witnesses to Westover's signature:
  H. S. MACKAYE,
  M. A. BUTLER.